(No Model.)

C. ROWE.
TRACTION ENGINE.

No. 271,129. Patented Jan. 23, 1883.

Attests
L. J. Matos
R. S. Child Jr.

Inventor
Cyrenius Rowe
By his atty

United States Patent Office.

CYRENIUS ROWE, OF WALES, NEW YORK, ASSIGNOR OF ONE-HALF TO EDWIN T. ALLEN, OF PHILADELPHIA, PENNSYLVANIA.

TRACTION-ENGINE.

SPECIFICATION forming part of Letters Patent No. 271,129, dated January 23, 1883.

Application filed May 13, 1882. (No model.)

*To all whom it may concern:*

Be it known that I, CYRENIUS ROWE, of Wales, in the county of Erie and State of New York, have invented an Improvement in Traction or Road Engines, of which the following is a specification.

My invention has reference to traction or road engines or vehicles driven by steam-power; and it consists in providing said vehicle or engine with a hinged frame pivoted to same at its forward end, and having its rear or lower end provided with a friction or toothed propelling-wheel adapted to be pressed upon the ground by springs, which may be made adjustable in power by mechanism hereinafter set forth; further, in making the upper shaft, upon which said frame is pivoted, the driving-shaft of the engines, and providing it with a sprocket or chain wheel, over which a chain passes to rotate the lower friction or toothed propelling-wheel, and in minor details of construction, all of which are fully set forth in the following specification and shown in the accompanying drawings, which form part thereof.

The object of my invention is to provide means for vehicles generally by which they may be propelled and overcome all ordinary obstacles on the roadway by causing the propelling force to be exerted in an oblique and upward direction, thereby tending to raise said vehicle and propel it forward at all times.

Figure 1:
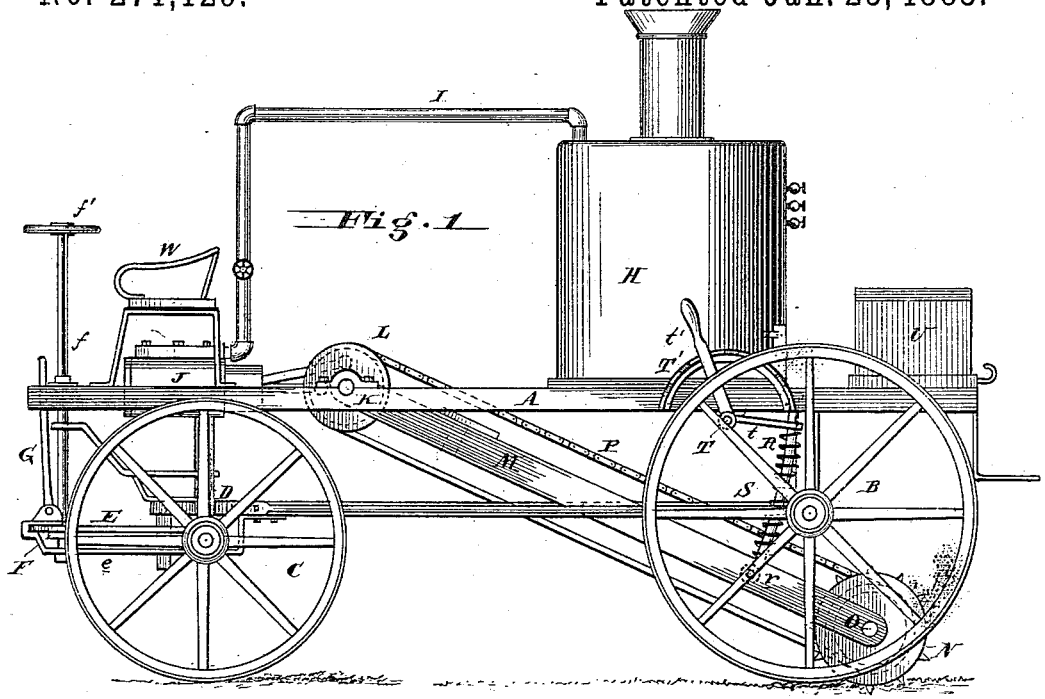
Figure 2:
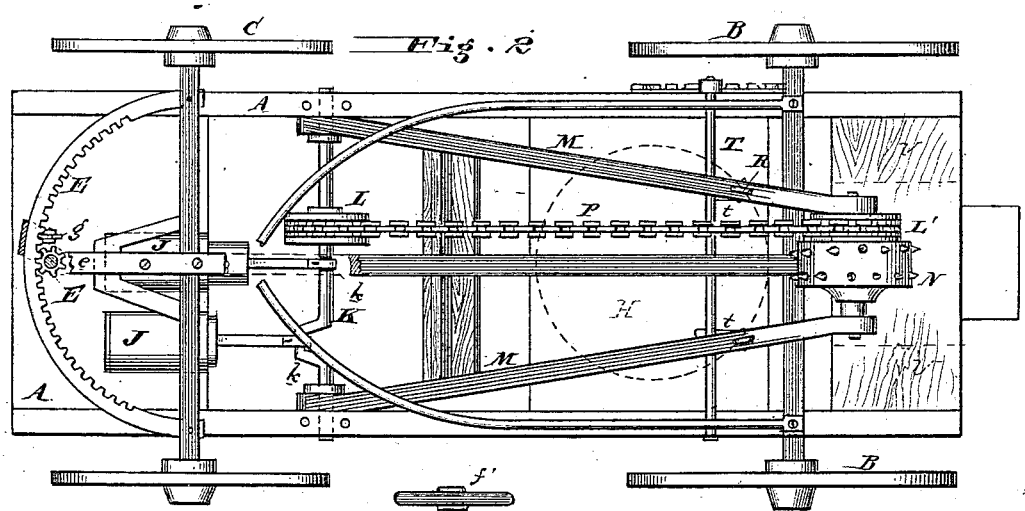
Figure 3:
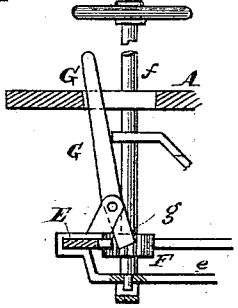

In the drawings, Figure 1 is a side elevation of a road-engine embodying my improvements. Fig. 2 is a plan view of same when inverted, and Fig. 3 is a sectional view of the steering and locking devices.

A is the frame, and is supported upon the wheels B C, the forward or steering wheels, C, being pivoted by the usual king-bolt to the frame A, or an auxiliary part of same at D. Secured to the axle of said wheels C, and concentric with the pivot-point D of same, is the segmental rack E, and gearing with it is the pinion F, which is secured upon the bottom of shaft $f$, provided at the top with a hand steering-wheel, $f'$, and supported in bearings $e$. By turning the hand-wheel in either direction the rack E may be moved, turning the wheels C in a corresponding direction, and thereby steer the vehicle. The rack E may be locked in any desired position with reference to the frame A by means of the pivoted lever G, pivoted to the framing $e$, and having its lower end, $g$, adapted to catch in the teeth of said rack. The operator or steersman sits upon a seat, W.

K is a rotating shaft working in suitable bearings in the forward end of the frame A, carries secured to it the sprocket or chain wheel L, and has one or more cranks, $k$, by means of which the engines J cause it to rotate. These engines may be of any desired construction, and receive steam from boiler H by the steam-pipe I. Hinged upon this shaft K is the traction-frame M, which carries at its lower end a shaft, O, upon which are secured the sprocket or chain wheel L' and friction or toothed propelling-wheel N. The two chain-wheels L L' are connected by means of a chain or band, P. The frame M, at or near its bottom, carries two uprights or rods, R, which may be pivoted or hinged to it at $r$, and encircling said rods R are springs S. A shaft, T, carrying arms $t$, adapted to support the upper ends of the rods R and press down upon the springs S, is journaled to frame A, and on one end carries an arm or lever, $t'$, by which it is adjusted, and the said lever may be locked in any desired position by a segmental ratchet or notched piece, T'.

U are the coal and water boxes.

The operation is as follows: The engines J being made to rotate the shaft K, the chain-wheels L L' and chain P cause the friction or toothed propelling-wheel N to be rotated, and as the frame M, which carries it, is pressed down toward the ground by springs S, the said wheel, by its rotation, causes the vehicle to be propelled forward, and as the direction of its resultant force is in a line with the frame M, the tendency is to raise said vehicle over all obstructions and cause it to be propelled with ease. If the load is increased, the traction force of wheel N may be increased by moving the lever $t'$ and compressing the springs S. The wheel N may have any desired shaped teeth and be driven by gearing or power direct. The frame A may be supported upon springs.

I am aware of the patents to Moore, No. 223,373, and Hanks, No. 217,941, and claim nothing therein shown or described.

Having now described my invention, what I claim as new, and desire to secure by Letters Patent, is—

1. In a traction or road engine, an oblique frame hinged at its upper and forward end to the vehicle-body, in combination with a friction or toothed propelling-wheel journaled at the bottom of said frame, mechanism to rotate said propelling-wheel, and a spring or springs to press said wheel down upon the ground.

2. In a self-propelling vehicle, an oblique frame hinged at its upper and forward end to the vehicle-body, in combination with a friction or toothed propelling-wheel journaled at the bottom of said frame, mechanism to rotate said propelling-wheel, and a spring or springs to press said wheel down upon the ground, when arranged with means to adjust their power to suit the load carried.

3. In a self-propelling vehicle, the combination of frame A, hinged frame M, shaft K, having cranks $k$, engines J, boiler H, chain-wheels L L', chain P, and friction or toothed wheel N, substantially as set forth.

4. In a self-propelling vehicle, the combination of frame A, hinged frame M, shaft K, having cranks $k$, engines J, boiler H, chain-wheels L L', chain P, friction or toothed propelling-wheel N, springs S, shaft T, having arms $t$, and means to lock them in any desired position, as set forth.

5. In a self-propelling vehicle, the frame A, wheels B, adjustable steering-wheels C, segmental rack E, pinion F, shaft $f$, hand-wheel $f'$, and pivoted locking-lever G, as shown and described.

In testimony of which invention I hereunto set my hand.

CYRENIUS ROWE.

Witnesses:
R. A. CAVIN,
R. S. CHILD, Jr.